United States Patent Office 3,351,573
Patented Nov. 7, 1967

3,351,573
CATALYZED STORAGE-STABLE QUICK DRYING COATING COMPOSITION CONTAINING POLY-URETHANE-POLYISOCYANATE FILM FORMER
Gerald R. Skreckoski, Buffalo, N.Y., assignor to Allied Chemical Corporation, New York, N.Y., a corporation of New York
No Drawing. Filed June 13, 1961, Ser. No. 116,694
7 Claims. (Cl. 260—18)

This invention relates to a coating composition containing a polyurethane-polyisocyanate film-forming solute together with a catalyst which is unique in that it accelerates the curing rate of the applied coating but does not cause the composition to thicken or gel during storage in containers and to a method for preparing such compositions.

Many superior coating compositions have heretofore been developed wherein the film-forming component is a polyurethane-polyisocyanate prepared by reacting polyols and polyisocyanates in certain ratios. In general such coatings dry very slowly unless a catalyst is used to accelerate the curing reaction. Heretofore the art added the catalyst to the coating composition immediately prior to use because of accelerated reactions causing the catalyzed composition to thicken and gel during storage so that the "pot life" of the catalyzed formulation was very short. Combinations of coating compositions and separately packaged catalyst to be added prior to use are known in the art as "two-can" formulations. They have enjoyed some success in industrial applications but have been considered unsuitable for retail distribution because they are too troublesome and wasteful in use to gain consumer acceptance. Reasons for this are: uniform mixing of a small amount of catalyst into a large amount of coating is tedious; catalyzed composition which is not used soon after preparation becomes wasted; the dosage of catalyst must be proportioned to the amount of composition; the catalyst container may easily become lost. Accordingly extensive and intensive efforts have been made to provide a "one-can" coating formulation which was storage stable, and quick drying, which did not require any mixing of catalyst into the formulation prior to use, and which provided the superior combination of properties obtainable from polyurethane-polyisocyanate film formers.

An object of the present invention is to provide packaged coating compositions which contain polyurethane-polyisocyanate film-formers, which are stable when stored, which dry quickly on application, which may be made at lower cost than comparable prior art formulations, and which provide hard clear coatings resistant to abrasion, weather, solvents, and chemicals and which are suitable for many uses including varnish-type coatings for both indoor and outdoor service.

A further object of the present invention is to provide a method for making such coating compositions wherein the process is carried out at lower temperature and/or in shorter time cycles by use of a catalyst which remains in the product, does not impair its stability during storage, and accelerates the drying rate of the coating after application.

The packaged, storage-stable quick-drying coating compositions of the present invention are solutions which are substantially free from water and alkaline reacting materials, which contain from 10% to 90% by weight of solvent component substantially free from compounds containing reactive hydrogen and from 10% to 90% by weight of solute component comprising a polyurethane-polyisocyanate film-former and a catalyst to accelerate the film forming reaction in the applied coating, said catalyst solute being an organo-compound of tetravalent tin wherein each tin atom is bonded to at least one carbon atom and at least one atom of oxygen, sulfur or chlorine, said polyurethane-polyisocyanate film-former solute being prepared by forming a reaction mixture of a polyol reactant and a polyisocyanate reactant, said polyol reactant having an average functionality between 2 and 4 inclusive and an average hydroxyl equivalent weight between 100 and 600, said polyisocyanate reactant having an average functionality between 2 and 3 inclusive and an average equivalent weight between 50 and 200, the amounts of polyisocyanate reactants and polyol reactants used being such that (1) the weight of polyisocyanate reactant is from 35% to 65% of the weight of the total polyisocyanate and polyol reactants, and (2) the ratio of NCO groups to OH groups in the reactant charge is between 1.5 and 2.2 inclusive, and heating said reaction mixture until the reaction between said polyisocyanate reactant and said polyol reactant is substantially complete.

The coating compositions are prepared by forming a substantially water-free, non-alkaline mixture of solvent, polyol reactant, and polyisocyanate reactant and heating said mixture until the reaction is substantially complete, as may be established by tests hereinafter described. Preferably the reaction mixture contains acid reacting material. Preferably the curing catalyst is added to the reaction mixture prior to the reaction, whereby the reaction may be completed at lower temperature levels and/or in shorter times than would be otherwise necessary.

*Solvent components*

Solvent components of the coating composition constitute from 10% to 90% by weight thereof (preferably, for the packaged composition, from 40% to 60% by weight thereof). The solvents should have a chemical composition such that they are substantially free from reactive hydrogen as determined by the Zerewitnoff method (cf. Kohler et al., 40 J. Am. Chem. Soc. 2181–8 (1927). Such reactive hydrogen (e.g. the hydrogen present in water, hydroxyl groups, carboxyl groups, primary and secondary amino groups, etc.) would react with the free isocyanate present in the reactants or reaction products. Suitable solvents include toluene, xylene, various petroleum hydrocarbon distillate fractions, isopropylether, ethyl acetate, β-ethoxyethyl acetate (also known as "Cellosolve acetate"), methyl ethyl ketone, and various mixtures thereof. The amount of solvent used will vary somewhat depending on the viscosity-imparting characteristics of the film-former solute. Composition of the solvent may be varied to provide a suitable evaporation rate for a given formulation and service requirement.

*Polyol reactants*

The polyol reactant is a polyol or (preferably) a mixture of polyols having an average functionality between 2 and 4 inclusive (preferably between 2 and 3 inclusive) and an average equivalent weight between 100 and 600 (preferably between 140 and 300). (The term "polyol" is here used with reference to compounds containing more than one aliphatic (i.e. alcoholic) hydroxyl group per molecule.)

Suitable polyols include the following:

(1) Castor oil and various related polyols including hydrogenated castor oil, and various esters and partial esters of ricinoleic acid with polyhydric alcohols. Such partial esters may be prepared either by direct esterification of ricinoleic acid or by transesterification of mixtures of castor oil and polyhydric alcohols (as hereinafter detailed, transesters prepared with use of some transesterification catalysts are unsuitable because residual catalyst in the transester has an adverse effect on the storage stability of coating compositions prepared from such transesters). Such esters and partial esters include: the mono- and di-ricinoleates of glycerine; mono- and di-ricinoleates of glycols such as mono-, di- and tri-ethylene or propylene glycols; mono-, di- and tri-ricinoleates of 1,2,6-hexanetriol, trimethylol propane, etc., mono-, di-, tri-, and tetra-ricinoleates of pentaerythritol, or erythritol.

(2) "Blown" drying oils such as blown soya, tung, linseed oils; and esters or partial esters of the fatty acids characterizing such oils with low molecular weight polyols.

(3) Polyether diols such as polyethylene glycol, polypropylene glycol, polytetramethylene glycol as well as polyalkylene glycols containing a mixture of alkylene (e.g. ethylene and propylene) units in the molecule.

(4) Polyether triols prepared by condensing alkylene oxides (e.g. ethylene oxide and propylene oxide) or mixtures of such alkylene oxides, with a low molecular weight triol such as glycerine, trimethylol propane and hexanetriol-1,2,6. Such a polyether triol prepared from ethylene oxide and glycerine would have the structure.

$$H_2CO)C_2H_4)_nOH$$
$$HCO(C_2H_4)_{n'}OH$$
$$H_2CO(C_2H_4)_{n''}OH$$

wherein $n$, $n'$ and $n''$ are integers.

(5) Polyethers tetrols such as may be obtained by addition polymerization of alkylene oxides with simple tetrols such as erythritol or pentaerythritol.

(6) Polyester-polyols prepared by copolymerizing low molecular weight polyols and polycarboxylic acids. They are made by reacting a mixture containing the polycarboxylic acids and polyols in proportions such that a stoichiometric excess of polyol is present to insure that the resulting polyester will have a preponderance of terminal hydroxyl groups over terminal carboxyl groups. Preferably the low molecular weight polyols are predominantly diols, e.g. mono-, di-, or tri-ethylene or propylene glycols, 1,4-butanediol, etc. Advantageously a small amount of tiol such as glycerine, hexanetriol, trimethylol ethane or trimethylol propane may be included; this causes the resulting polyester polyol to have a functionality greater than 2. Suitable acid reactants include adipic, succinic, maleic, phthalic, and terephthalic acids.

(7) Simple low molecular weight polyols such as mono-, di-, and triethylene glycols, mono-, di-, and tripropylene glycols, glycerine, trimethylol ethane, trimethylol propane, hexanetriol-1,2,6-erythritol and pentaerythritol. Such simple polyols are used in combination with higher molecular weight polyols in order to obtain a polyol reactant mixture having the average equivalent weight required to obtain good film properties in the applied coating.

The number of hydroxyl group equivalent represented by a given weight of polyol reactant charged is given by the expression $$\frac{\text{weight of polyol component charged} \times \text{number of hydroxyl groups per molecule thereof}}{\text{molecular weight thereof}}$$

The average equivalent weight of a polyol reactant charge containing a mixture of polyols is obtained by dividing the total weight of the charge by total number of hydroxyl group equivalents contained therein.

Polyisocyanate reactants

Organic polyisocyanates suitable for making the coating compositions of the present invention include, among many others, 2,4- and 2,6-tolylene diisocyanates, para and meta phenylene diisocyanates, 1-chlorophenylene-2,4-diisocyanate, 1,5-napthalene diisocyanate, 3,3'-bitolylene-4,4'-diisocyanate, diphenylmethane-4-4'-diisocyanate, hexamethylene diisocyanate, naphthalene diisocyanate, naphthalene triisocyanate, and triisocyanates such as are obtained by reacting 1 mol of a triol such as trimethylol propane with 3 mols of a diisocyanate such as tolylene diisocyanate. The number of isocyanate equivalents represented by a given weight of polyisocyanate charged is given by the expression $$\frac{\text{weight of isocyanate component charged} \times \text{number of isocyanate groups per molecule thereof}}{\text{molecular weight thereof}}$$

The average equivalent weight of a polyisocyanate reactant charge containing a mixture of polyisocyanates is obtained by dividing the total weight of the charge by the total number of isocyanate groups contained therein.

Catalysts

Catalysts contained in the coating compositions of the present invention are organo compounds of tetravalent tin wherein each tin atom is bonded to at least one carbon atom and at least one atom of oxygen, sulfur or chlorine and which are soluble in the solvent phase of the composition. (Numerous known compounds of this type are disclosed in "Organotin Compounds" by R. K. Ingham and S. D. Rosenberg, pp. 459–539, Chemical Reviews, v. 60, No. 5 (October 1960).) Preferred catalysts have the structure $R_2SnX_2$ wherein R is a hydrocarbon radical, X is chlorine, or an acyloxy, alkoxy, aryloxy, alkylthio or arylthio radical, or wherein $X_2$ represents an oxygen or sulfur atom. Also operative are compounds of the structure $R_3SnX$ and $$R\underset{\underset{O}{\|}}{Sn}OH$$

wherein R is a hydrocarbon radical and X is chlorine, or an acyloxy, alkoxy, aryloxy, alkylthio or arylthio radical. Representative catalysts are listed below. Many of these are commercially availble products.

Dibutyl tin dilaurate
Dibutyl tin-di-2-ethylhexoate
Dibutyl tin diacetate
Dibutyl tin maleate
Dibutyl tin dichloride
Dibutyl tin oxide
Dibutyl tin sulfide
Dibutyl tin dibutoxide
Dibutyl tin dilaurylmercaptide
Dibutyl tin bis(o-phenyl phenate)
Dibenzyl tin di(2-ethylhexoate)
Di(2-ethylhexyl) tin oxide
Tributyl tin acetate
Tributyl tin o-phenyl phenate
Butyl tin trichloride
2-ethylhexyl stannonic acid.

Among the foregoing catalysts dibutyl tin dilaurate is preferred because of its high activity, high selectivity, ready commercial availability and relatively low cost.

Inoperative catalysts and catalyst combinations

Many catalysts generally effective to accelerate reactions between organic isocyanates and compounds containing reactive hydrogen have been used to accelerate the cure of coating compositions containing a polyurethane-polyisocyanate film-former by the "two-can" procedure wherein the catalyst is added immediately prior to the application of the coating. Such catalysts (which have also been used in the preparation of polyurethane foams and elastomers) include tertiary organic amines (e.g. N-methyl morpholine, triethylamine, adipic acid diester or diethylaminoethanol), inorganic bases (e.g. sodium hydroxide, sodium methylate), metal dryers (cobalt and lead napththenates and certain tin salts (stannic chloride, stannous octoate). These catalysts can not be used in one can formulations because they catalyze reactions causing the formulation to thicken and gel during storage. Thus all catalysts having the property of accelerating curing of coating compositions containing polyurethane-polyisocyanate film former are not suitable in the present invention and workers in the field consistent with experience expected all such catalysts to also have high activity for catalyzing reactions between isocyanates and active hydrogen causing the formulation to thicken and gel. In the present invention a specified group of organo tin catalysts as defined herein were found to catalyze the cure of coating compositions containing polyurethane-polyisocyanate film former without catalyzing reactions which causes the formulation to thicken and gel. Indeed related tin compounds i.e. stannic chloride and stannous octoate were found to be unsuitable in the present invention. Recently synergistic mixtures of organo tin catalysts and tertiary amines have been used as catalysts for the preparation of certain polyurethane foams. Such synergistic catalyst mixtures are described in Belgian patent specifications 584,320. They are not operative in the "one-can" coating compositions of the present invention because the tertiary amine component catalyzes gel formation. Similar catalyst mixtures of the subject organotin compounds and other catalysts such as inorganic bases, metal driers, and various tin salts are likewise inoperative.

*Desirable quality specifications for reactant raw materials*

The storage stability of coating compositions containing polyurethane-polyisocyanate film former is impaired if alkaline-reacting material is present therein and is improved if acid-reacting material is present. Accordingly, it is important to insure that alkaline material is absent and it is desirable to insure that acid material is present. Levels of acidity or alkalinity in such organic systems can not be measured or specified in quantitative terms analogous to the pH of aqueous systems. However one may insure that alkali is absent and acid is present by controlling the acid and alkali content of reactant raw materials.

Organic diisocyanates as produced may contain enough acid reacting material to insure storage stability of coating compositions made therefrom if the other reactants are alkali-free. This acid reacting material is specified as "titratable acidity" and "hydrolyzable chlorine." Analytical procedures for determining the "titratable acidity" and "hydrolyzable chlorine" contents of tolylene diisocyanate are given in paragraphs 47–53 inclusive and 39–46 inclusive, respectively, of American Society For Testing Materials Method D 1638–60T, "Tentative Methods for Testing Urethane Foam Raw Materials," described on pp. 124–7 of "1960 Supplement to Book of ASTM Standards, Including Tentatives, Part 9." Representative tolylene diisocyanates generally have titratable acidities of about 0.01% by weight calculated as HCl and hydrolyzable chlorine contents of 0.015% by weight calculated as chlorine. Such acidity levels are adequate provided the other reactants are alkali free. The "titratable acidity" or organic diisocyanates can be increased if desired by adding hydrogen chloride thereto. Other acid reacting materials such as acid chlorides (acetyl chloride, benzoyl chloride, etc.) may be incorporated in the formulation as illustrated by Example 4, below.

Polyether polyols may be acid or alkaline in reaction. They may be tested by dissolving them in aqueous methanol and measuring the "pH" of the resulting solution, with an indicator or a pH meter. Material showing a "pH" below 7 under such conditions is satisfactory. (Such "pH" measurements are not necessarily quantitatively significant because of the alcoholic solvent in the solution tested but are adequate for present purposes.) Similar tests may be made on monomeric glycol and triol reactants. The "acid number" of castor oil and polyester polyols may be measured by well known standard procedures.

Transesters of castor oil should not contain such transesterification catalysts as calcium, lead or cobalt naphthenates. If it is desired to use transesters, they may be prepared by using a small amount of water as a catalyst (cf. Example 5, below).

The water content of the composition should be kept as low as is practically possible, in any event below 0.1% by weight. As illustrated in the subsequent examples, water may be removed from some solvent mixtures or solvent-polyol mixtures by azeotropic distillation. Polyol reactants may be dried by heating under vaccum as described in Example 1, below. The water content of solvent mixtures or solvent polyol mixtures may be determined by the well known Karl Fischer method.

*Preparation of coating compositions*

The coating compositions are preferably prepared by forming a dry mixture of solvent, polyol and catalyst and then reacting this with polyisocyanate in clean dry equipment. Preferably the reaction is carried out under a blanket of inert gas such as nitrogen to prevent contact between the reaction mixture and water vapor.

The reaction is exothermic so that some increase in temperature level occurs during mixing. Thereafter the reaction mixture is heated and agitated at a moderately elevated temperature (50–100° C.) until the reaction is substantially complete.

The reaction may be considered complete if the measured "amine equivalent" of a sample of the batch is within 10% of the theoretical value. By "amine equivalent" is meant the weight of a portion of the batch which contains one equivalent weight of isocyanate, the weight units being consistent. It is determined by an analytical procedure involving a reaction between isocyanate and n-dibutylamine to form the corresponding urea and back-titration with HCl solution to measure the unreacted excess of n-dibutylamine. The theoretical amine equivalent is given by the expression $$AE = WB/(n(NCO) - n(OH))$$

wherein:

AE = amine equivalent
WB = weight of batch
$n(NCO)$ = number of equivalents of isocyanate (total) charged to process
$n(OH)$ = number of equivalents of hydroxyl (total) charged to process If the measured value of the amine equivalent is below the theoretical, it signifies that the reaction between the hydroxyl groups and isocyanate groups present in the batch is incomplete. If the measured value is above the theoretical, it signifies that some of the isocyanate charged to the process has been consumed in side reactions, such as reactions with water or other impurities containing reactive hydrogen, or in cross linking reactions between isocyanate groups and the hydrogen present in urethane bonds.

The amine equivalent is determined as follows: weigh 6 to 8 grams of sample, dilute with 35–50 cc. of C.P. toluene, add 20 cc. of 2 N solution of dibutylamine in C.P. toluene, heat 5 to 10 minutes (do not boil), cool, add 100 cc. of methanol, add 10 drops of Bromphenol Blue indicator solution, titrate with 1 N HCl to the disappearance of blue color, run a blank. The value of the measured amine equivalent is calculated by the equation:

$$AE = \frac{1000\ WS}{(TB - TS)N}$$

wherein:

WS = weight of sample in grams
TB = titration of blank in ml. HCl
TS = titration of sample in ml. HCl
N = normality of HCl The analytical procedure is similar to a method for assaying tolylene diisocyanate described in paragraphs 5–13 inclusive of American Society for Testing Materials method 1638–60T, "Tentative Methods for Testing Urethane Foam Raw Materials" on pp. 115–7 of "1960

Supplement to Book of ASTM Standards, Including Tentatives, Part 9."

The reaction may be completed at lower temperatures and/or in shorter time cycles if the catalyst is included among the reactants (cf. Example 2 below). This of itself provides an important advantage not obtainable with prior art catalysts that have heretofore been used to accelerate the cure of similar coating compositions in two-can formulations. Such catalysts would cause the batch to thicken and gel during manufacture.

However the catalyst may be added after the reaction is complete but before the coating composition is packaged in containers. Also the catalyst may be added in part before the reaction and in part after the reaction but before packaging. This may be advantageous when it is desired to use relatively higher catalyst concentrations because addition of too much catalyst during preparation of the composition may cause the reaction to be so vigorous that it is difficult to control.

*Relation between composition variables and film properties*

The drying rate of a formulation based on a given polyol component may be increased by increasing (1) the catalyst concentration and/or (2) the isocyanate concentration, i.e. the weight percent of isocyanate reactant on the total weight of formulation non volatiles, which for all practical purposes may be considered equal to the total weight of polyol and polyisocyanate raw materials. In general it is preferable to reduce the drying time by means of the catalyst because increasing the isocyanate concentration will (1) increase costs and (2) result, for the most part, in harder formulations which have less abrasion resistance and flexibility.

Formulations based on castor oil and various esters of ricinoleic acid and the like often have intrinsically slower drying times than formulations based on synthetic polyether polyols such as polypropylene glycol. However the castor oil type formulations often have superior weather resistance making them more suitable for outdoor service such as coatings for boats and other marine structures (cf. Examples 2 and 3, below). The applied coatings will cure or "dry" faster under conditions of higher atmospheric humidity.

The best catalyst concentration for a given coating will vary according to (1) the chemical composition and activity of the film-former and catalyst and (2) requirements incidental to the intended use of the coating. Concentration relations are not "critical": too little catalyst has too little effect and too much catalyst represents an unnecessary and uneconomical surplussage. Usually catalyst concentrations in the range 0.005 to 0.5 (preferably 0.02 to 0.1) weight percent on the non-volatiles are adequate. Most of the above listed catalysts have activities within the same order of magnitude. The catalyst must however be soluble in the formulation at an effective concentration. Insoluble catalysts do not given useful results. The solvent concentration in the composition may be varied to adjust for the differing viscosity-imparting characteristics of different film-formers. The coatings are applied by conventional means such as brushing or spraying.

*Analytical procedures*

Analytical procedures involved in making coating compositions described below have been previously referred to or described. The Karl Fischer method for determining water, ASTM methods for determining 'titratable acidity" and "hydrolyzable chlorine" in tolylene diisocyanate, and a procedure for determining the presence of acid or alkali in polyols are noted above in the section "Desirable Quality Specifications for Reactant Raw Materials." The "amine equivalent" measurement involved in the determination of completeness of reaction between polyol and polyisocyanate is described above in the section "Preparation of Coating Compositions."

Data given in the examples on the film properties of applied coatings were obtained according to standard procedures as follows:

Drying times are on a "dry-through" basis. A coating is considered to have dried throughout the thickness of the film if it does not retain a print or impression after a thumb is pressed hard against it. So-called "tack-free" drying times are less significant for present purposes because they vary with the evaporation rate of the solvent in the formulation and do not necessarily reflect the rates of chemical reactions involved in the cure.

Viscosity measurements are by the Gardner-Holt procedure widely used in the coatings industry.

The Sward hardness tests were made by the rocking device and procedure described on pages 164–6 of "Physical and Chemical Examination: Paints, Varnishes, Lacquers, Color" by H. A. Gardner and G. G. Sward, Bethesda, Md., 11th ed. (1950).

EXAMPLE 1

A. Preparation of catalyzed formulation

The "Cellosolve Acetate" solvent used in this example is β-ethoxy ethyl acetate.

The tolylene diisocyanate used ("Nacconate 80") is a liquid mixture of isomeric tolylene diisocyanates containing about 80% of 2,4 isomer and 20% of 2,6 isomer. It had a "titratable acidity" content equivalent to 0.01% by weight of HCl and a "hydrolyzable chlorine" content of about 0.015% by weight of chlorine.

The polyether triol used in this example "Niax Triol LG 168," had a molecular weight of about 1000 and a hydroxyl number of about 168, an hydroxyl equivalent weight of about 335, and was prepared by addition polymerization of propylene oxide and glycerine. It was slightly acid in reaction as determined by measuring the "pH" of a 10% weight solution of triol in 10:1 methanol:water mixture with a Beckman pH meter.

The dibutyl tin dilaurate catalyst used was a product marketed as "D-22 Stabilizer."

A solvent mixture prepared from—

| Solvent | Parts by wt. | Wt. percent on total formulation |
|---|---|---|
| Xylene | 1,090 | 20 |
| "Cellosolve acetate" | 1,090 | 20 | was dried by distilling to remove water as water-xylene azeotrope. The xylene distilled off was replaced by dry xylene. Moisture content of the dried solvent mixture was 0.001%.

A polyol mixture was prepared from the following components.

| Polyol | Parts by weight | Wt. percent on non-volatiles | OH equivalents |
|---|---|---|---|
| "LG-168" | 2,764 | 60.3 | 8.3 |
| Trimethylol propane | 76 | 1.7 | 1.7 |
| Total | 2,840 | 62.0 | 10.0 |

Average OH equivalent weight _____ 284
Acid content _____ >0

The polyol mixture was dried by heating for 20–30 minutes at 140–150° C. under a vacuum 1–2 mm. Hg. Moisture content of the dried material was 0.0015%. The solvent mixture and polyol mixture were then combined and charged with 2.3 parts (0.05 wt. percent on non-volatiles) of dibutyl tin dilaurate catalyst.

A reactor was thoroughly purged with dry nitrogen and charged with tolylene diisocyanate. The following data pertain to this charge.

| | |
|---|---|
| Parts by weight | 1740 |
| Wt. percent on non-volatiles | 38 |
| NCO equivalents | 20 |
| Titratable acidity as HCl, wt. percent on non-volatiles | 0.0038 |

The solvent-polyol-catalyst mixture was added to the tolylene diisocyanate during a 30 minute period in which the mass was agitated and maintained under a blanket of dry nitrogen. The mixture was then heated at 60° C. for 1½ hours. Reaction was considered complete when the amine equivalent reached 982 (which was within 10% of the theoretical value of 916).

The resulting solution had a non-volatile content of 60% and was characterized by an NCO/OH ratio (for the reactants) of 2.0.

B. Preparation of uncatalyzed formulation

An uncatalyzed formulation was prepared as described in part A except that (1) the catalyst was omitted and (2) the reaction mixture was held at 60° C. for 6 hours and then at 80° C. for an additional hour until the amine equivalent reached a value of 885.

C. Properties of catalyzed and uncatalyzed coatings

| | | |
|---|---|---|
| Wt. percent catalyst on non-volatiles | 0.05 | 0 |
| Amine equivalent | 982 | 885 |
| Gardner Holt viscosity | <A | <A |
| Dry time (hours) | 5–6 | 12–18 |
| Sward hardness (after 24 hrs.) | 32 | 16 |
| Properties after 6 months storage: | | |
| Gardner Holt viscosity | A | A |
| Amine equivalent | 1,010 | 1,059 |
| Dry time, hours | 8–10 | 18–24 |
| Sward hardness (after 24 hrs.) | 32 | 22 |

EXAMPLE 2

A. Preparation of uncatalyzed formulation

A solvent mixture was prepared from—

| Solvent | Parts by wt. | Wt. percent on total formulation |
|---|---|---|
| Xylene | 1,090 | 20 |
| "Cellosolve Acetate" | 1,090 | 20 |

A polyol mixture was prepared from the following components.

| Polyol | Parts by weight | Wt. percent on non-volatiles | OH equivalents |
|---|---|---|---|
| Polypropylene glycol (m.w. 1,000) | 1,485 | 45.3 | 2.97 |
| 1,4 butylene glycol | 46 | 1.3 | 1.02 |
| Trimethylol propane | 269 | 8.2 | 6.02 |
| Total | 1,800 | 54.8 | 10.01 |

| | |
|---|---|
| Average equivalent weight | 180 |
| Acid content | >0 |

The polyol mixture and solvent mixture were added to a reactor wherein the resulting solution was dried by distilling to remove water as a xylene-water azeotrope, the condensed distillate being phase-separated with return of xylene to the still.

The reactor was thoroughly purged with dry nitrogen and charged with a tolylene diisocyanate mixture similar to that of Example 1 except that the "titratable acidity" content was equivalent to 0.008% by weight of HCl and the "hydrolyzable chlorine" content was equivalent to 0.012% by weight of chlorine. Data pertaining to the tolylene diisocyanate charge are as follows:

| | |
|---|---|
| Parts by weight | 1480 |
| Wt. percent on non-volatiles | 45 |
| NCO equivalents | 17 |
| Titratable acidity as HCl, wt. percent on non-volatiles | 0.0036 |

The reaction mixture was held at 70° C. for 6 hours. The reaction was considered complete when the amine equivalent reached 767 (which was within 10% of the theoretical value of 780).

The resulting solution had a non-volatile content of 40% and was characterized by an NCO/OH ratio (for the reactants) of 1.7.

B. Catalyst addition after reaction

The formulation was prepared as described in part A except that 0.1 part of dibutyl tin dilaurate catalyst (0.03 wt. percent catalyst on the non-volatiles) were added after completion of the reaction between the polyol and polyisocyanate.

C. Catalyst addition after reaction

This formulation was prepared as described in part B except that 0.33 part catalyst (0.1 wt. percent on the non-volatiles) were added.

D. Catalyst addition before reaction

This formulation was prepared as described in part B except that (1) 0.1 part catalyst (0.03 wt. percent on the non-volatiles) were added to the dried solvent-polyol mixture prior to addition of the diisocyanate and (2) the reaction mixture was held at 60° C. for 5 hours to complete the reaction. Amine equivalent of the reaction product was 775.

E. Catalyst addition before reaction

This formulation was prepared as described in part D except that (1) 0.33 part catalyst (0.1 wt. percent on the non-volatiles) were added prior to the reaction and (2) the reaction mixture was held at 60° C. for only 1 hour to complete the reaction. Amine equivalent of the reaction product was 787.

F. Properties of coatings

Data on the film properties of the coating compositions prepared as described in parts A–E are tabulated in Table I.

TABLE I.—PREPARATION AND PROPERTIES OF COATING COMPOSITIONS OF EXAMPLE 2

| | Sample | | | | |
|---|---|---|---|---|---|
| | A | B | C | D | E |
| | | After | After | Before | Before |
| Catalyst added before or after reaction: | | | | | |
| Catalyst concentration wt. percent on non-volatiles | 0 | 1.03 | 0.1 | 0.03 | 0.1 |
| Reaction Temp., °C | 70 | 70 | 70 | 60 | 60 |
| Reaction time, hrs | 6 | 6 | 6 | 5 | 1 |
| Properties of Composition: | | | | | |
| Initial amine equivalent [1] | 767 | 767 | 767 | 775 | 787 |
| Dry time, hrs | 12–20 | 6–6½ | 5½–6 | 5–5½ | 5–5½ |
| Gardner Holt Viscosity | E | E | E | E | G–H |
| Sward hardness, after 24 hrs | 40 | 44 | 40 | 40 | 42 |
| Properties After 6 Months Storage: | | | | | |
| Amine equivalent | 840 | 831 | 825 | 835 | 830 |
| Gardner Holt viscosity | I–J | H–I | J–K | J | L–M |
| Dry Time, hrs | 14–20 | 3–4 | 2½–3½ | 5–6 | 2½–3½ |

[1] Theoretical amine equivalent for all samples is 780.

EXAMPLE 3

A. Preparation of catalyzed formulation

The polyol mixture used in this example was a mixture of ricinoleic acid esters prepared by blending two commercial products: "Polycin 51" (a technical grade of propylene glycol monoricinoleate) and "Polycin 52" (a mixture of glycerine mono and diricinoleates). Data on these products are as follows:

|  | "Polycin 51" | "Polycin 52" |
|---|---|---|
| Hydroxyl equivalent weight | 186 | 163 |
| Approximate functionality | 2.3 | 2.9 |
| Hydroxyl No | 295 | 340 |
| Acid value | 1 | 5 |
| Estimated molecular weight | 430 | 475 |
| Viscosity, cps. at 25° C | 680 | 900 |

The following data pertain to the polyol mixture used.

| | |
|---|---|
| "Polycin 51," parts by weight | 1380 |
| "Polycin 52," parts by weight | 420 |
| OH equivalent weight | 180 |
| Average functionality | 2.45 |
| No. of hydroxyl equivalents in mix. | 10 |

A solvent mixture was prepared from—

| Solvent | Parts by wt. | Wt. percent on total formulation |
|---|---|---|
| Xylene | 1,090 | 20 |
| Cellosolve acetate | 1,090 | 20 |

The solvent mixture and polyol mixture were charged to a reactor where the resulting solution was dried by distilling to remove water as a water-xylene azeotrope, the condensed distillate being phase-separated and returned to the still. The water content was reduced to 0.005%. Dibutyl tin laurate (3.3 parts–0.1% by weight on the total formulation non-volatiles) was added to the dried solution.

The reactor was purged with dry nitrogen and charged during 5 minutes with o-tolylene diisocyanate mixture similar to that of Example 1. The following data pertain to the diisocyanate charge.

| | |
|---|---|
| Parts by weight | 1480 |
| Wt. percent on non-volatiles | 45 |
| No. of isocyanate equivalents | 17 |
| Titratable acidity as HCl, wt. percent on non-volatiles | 0.0045 |

The resulting mixture was held at 60° C. for 8 hours when completeness of reaction was evidenced by an isocyanate equivalent of 728 (compared to a theoretical value of 780).

The resulting solution had a non-volatiles content of 60% and was characterized by an NCO/OH ratio (for the reactants) of 1.7.

B. Preparation of uncatalyzed formulation

An uncatalyzed formulation was prepared as described in part A except that the catalyst was omitted. Isocyanate equivalent of the reaction product was 720.

C. Properties of catalyzed and uncatalyzed coatings

|  | A | B |
|---|---|---|
| Wt. percent catalyst on non-volatiles | 0.1 | 0 |
| Initial amine equivalent | 728 | 720 |
| Viscosity (Gardner Holt) | C–D | A–B |
| Dry time (hrs.) | 18–24 | 30–36 |
| Sward hardness, after 3 days | 64 | 45 |
| Properties after 6 months storage: |  |  |
| Amine equivalent | 757 | 759 |
| Viscosity (Gardner Holt) | D–E | D |
| Dry time (hrs.) | 14–20 | 40–48 |

Weatherometer: only change after 1300 hours exposure was slight loss of gloss.

EXAMPLE 4

A. Preparation of catalyzed formulation

The castor oil used in this example "DB" oil had an equivalent weight, hydroxyl group basis of 345 and an acid number of 1.

The diphenylmethane - 4,4' - diisocyanate ("Nacconate 300") had a solidification point of 37.2° C.

Castor oil (1550 parts=4.5 hydroxyl group equivalents) was dissolved in 2500 parts xylene. The mixture was dried by distilling to remove water as a water-xylene azeotrope. Xylene distilled off was replaced by dry xylene. Water content of the dried material was 0.007%. Dibutyl tin laurate catalyst (0.25 part=0.01% by weight on the total non-volatiles content of the formulation) was added to the castor oil solution.

A reactor was thoroughly purged with dry nitrogen and charged with diphenylmethane-4,4'-diisocyanate (950 parts=7.6 NCO equivalents) containing 3.7 parts of benzoyl chloride, added to insure that the reaction product was acidic in character. The resultant potential acidity (calculated as weight percent HCl on the total formulation non-volatiles) was 0.038%. The mass was heated to 50° C., charged with the xylene-castor oil-catalyst solution during 20 minutes, and held at 60° C. for 1–1½ hours.

The following table summarizes data relating to the preparation of the film former.

| | |
|---|---|
| Solvent, wt. percent | 50 |
| Castor oil: |  |
| Wt. percent on non-volatiles | 62 |
| OH group equivalents | 4.5 |
| Diisocyanate: |  |
| Wt. percent on non-volatiles | 38 |
| NCO group equivalents | 7.6 |
| Over-all NCO/OH ratio | 1.7 |
| Percent non-volatiles | 50 |

B. Preparation of uncatalyzed formulation

An uncatalyzed formulation was made as described in part A above except that the dibutyl tin dilaurate and benzoylchloride were omitted.

C. Properties of catalyzed and uncatalyzed coatings

|  | Catalyzed | Uncatalyzed |
|---|---|---|
| Wt. Percent catalyst on non-volatiles | 0.01 | 0 |
| Amine equivalent: |  |  |
| Calculated | 1,600 | 1,600 |
| Measured | 1,550 | 1,650 |
| Gardner Holt viscosity | E–F | H |
| Dry time, hrs | 48 | 60 |
| Properties after 7 months storage: |  |  |
| Stability | (¹) | (¹) |
| Viscosity | Q–R | N–O |
| Dry time, hrs | 24 | 48 |

¹ Very Good.

Note.—This example shows that the catalyst is effective in very small concentrations. (0.01 wt. percent on the non-volatiles.) However the dry time of the catalyzed formulation is still rather long. Accordingly it would be better to use larger catalyst concentrations.

EXAMPLE 5

This example presents data comparing the properties of coating compositions prepared from a polyol mixture of castor oil and trimethylol propane wherein the polyols were (1) simply mixed and (2) transesterified prior to the reaction with diisocyanate.

A. Preparation of catalyzed coating from simple polyol mixture

A solvent mixture was prepared from—

| Solvent | Parts by weight | Wt. percent on total formulation |
|---|---|---|
| Xylene | 1,090 | 20 |
| Cellosolve acetate | 1,090 | 20 |

A polyol mixture was prepared from—

| Polyol | Parts by weight | Wt. percent on non-volatiles | Hydroxyl equivalents |
|---|---|---|---|
| Castor oil | 1,441 | 44 | 4.18 |
| Trimethylol propane | 259 | 8 | 5.8 |
| Total | 1,700 | 52 | 9.98 |

Average equivalent weight _____ 170
Acid content _____ >0

The solvent mixture and polyol mixture were charged to a reactor where the resulting solution was dried by distilling to remove water as a water-xylene azeotrope, the condensed distillate being phase-separated with return of xylene to the still. The water content of the mixture was reduced to 0.005%. Dibutyl tin dilaurate (0.13 part = 0.04% by weight, on the total formulation non-volatiles) was then added to the dried polyol solution.

The reactor was purged with dry nitrogen and charged with a tolylene diisocyanate mixture similar to that of Example 1. The following data pertain to the diisocyanate charge.

Parts by weight _____ 1570
Wt. percent on non-volatiles _____ 48
Isocyanate equivalents _____ 18
Titratable acidity as HCl wt. percent on non-volatiles _____ 0.0048

The reaction mixture was held at 60° C. for 2 hours until the amine equivalent approached the theoretical value (681).

The resulting solution had a non-volatiles content of 60% and was characterized by an NCO/OH ratio (for the reactants) of 1.8.

B. Preparation of coating from uncatalyzed polyol mixture

A coating was prepared as described above except that the catalyst was omitted.

C. Preparation of coatings from transesterified polyol mixture

The polyol mixture, solvent mixture tolylene diisocyanate and catalyst used in this example were the same in composition and amount as those described in part A. supra.

The polyol mixture was charged with 0.34 part water, added as a transesterification catalyst, heated to 250° C., and held thereat for 2 hours. (Water was used as a transesterification catalyst because, in a similar experiment not here described, it was found that calcium naphthenate transesterification catalysts could not be used to prepare one-can coating compositions. The formulations would gel on storage even if very small amounts of calcium were present.)

The batch was then cooled and the solvent mixture added. The resulting mixture was dried as described above. Catalyst and diisocyanate were added. The reaction mixture was held at 60° C. for 3 hours to complete the reaction.

D. Properties of coating compositions prepared from simple and transesterified castor oil-trimethyl propane mixtures

| | Simple Mixtures | | Transester |
|---|---|---|---|
| Wt. percent catalyst on non-volatiles | 0.04 | 0 | 0.04 |
| Viscosity (Gardner Holt) | O–P | I | D |
| Dry time, hours | 5–6 | 10–16 | 8–10 |
| Sward hardness: | | | |
| 24 hours | 35 | 10 | 17 |
| 1 week | 63 | 60 | 75 |

Although certain preferred embodiments of the invention have been disclosed for purpose of illustration, it will be evident that various changes and modifications may be made therein without departing from the scope and spirit of the invention.

I claim:

1. A package comprising a closed container containing a catalyzed storage-stable quick-drying coating composition which is substantially free from water and alkaline reacting materials, said water content being less than 0.1%, which contains from 10 to 90% by weight of solvent component substantially free from compounds containing reactive hydrogen and from 10 to 90% by weight of solute component comprising a polyurethane-polyisocyanate film-former and a catalyst to accelerate the film forming reaction in the applied coating, said catalyst being an organo-compound of tetravalent tin having at least one carbon atom bonded to the tin atom of said organo-compound and at least one atom selected from the group consisting of oxygen, sulfur and chlorine bonded to the tin atom of said organo-compound, the sum of bonds of tin to carbon and to said atoms being equal to four, said polyurethane-polyisocyanate film-former solute being prepared by forming a reaction mixture of a polyol reactant and a polyisocyanate reactant, said polyol reactant being an organic compound containing carbon, oxygen and hydrogen having a plurality of aliphatic hydroxyl groups and having an average functionally between 2 and 4 inclusive and an average hydroxyl equivalent weight between 100 and 600, said polyisocyanate reactant being an organic compound containing carbon, hydrogen, oxygen and nitrogen having a plurality of —NCO groups per molecule and having an average functionality between 2 and 3 inclusive and an average equivalent weight between 50 and 200, the amounts of polyisocyanate reactants and polyol reactants used being such that (1) the weight of polyisocyanate reactant is from 35% to 65% of the weight of the total polyisocyanate and polyol reactants, and (2) the ratio of NCO groups to OH groups in the reactant charge is between 1.5 and 2.2 inclusive, and heating said reaction mixture until the reaction between said polyisocyanate reactant and said polyol reactant is substantially complete.

2. A package as claimed in claim 1 wherein the water content of the composition is below 0.1% by weight and wherein the solvent component is 40% to 60% by weight and wherein the polyol reactant has an average functionality between 2 and 3 and an average hydroxyl equivalent weight between 140 and 300.

3. A package as claimed in claim 1 wherein the catalyst has the structure $R_2SnX_2$ wherein R represents a hydrocarbon radical, wherein X represents a member selected from the group consisting of chlorine, acyloxy, alkoxy, aryloxy, alkylthio and arylthio radical.

4. A package as claimed in claim 1 wherein the catalyst has the structure

wherein R represents hydrocarbon radical.

5. A package as claimed in claim 1 wherein the catalyst has the structure $R_3SnX$ wherein R represents a hydrocarbon radical and wherein X represents a member selected from the group consisting of chlorine, acyloxy, alkoxy, aryloxy, alkylthio and arylthio radical.

6. A package as claimed in claim 1 wherein the catalyst is dibutyl tin dilaurate.

7. A package as claimed in claim 1 wherein the catalyst has the structure $$R_2Sn=Y$$

wherein R represents a hydrocarbon radical and Y represents an atom selected from the group consisting of oxygen and sulfur.

References Cited

UNITED STATES PATENTS

| | | | |
|---|---|---|---|
| 2,981,712 | 4/1961 | Harper | 260—22 |
| 3,027,399 | 3/1962 | Merten | 260—77.5 |
| 3,084,177 | 4/1963 | Hostettler et al. | 260—77.5 |
| 3,148,162 | 9/1964 | Gmitter et al. | 260—77.5 |

FOREIGN PATENTS

| | | |
|---|---|---|
| 610,076 | 12/1960 | Canada. |
| 1,212,252 | 3/1960 | France. |

DONALD E. CZAJA, *Primary Examiner.*

M. STERMAN, LEON J. BERCOVITZ, *Examiners.*

R. W. GRIFFIN, *Assistant Examiner.*